US006023580A

United States Patent [19]
Sifter

[11] Patent Number: 6,023,580
[45] Date of Patent: *Feb. 8, 2000

[54] APPARATUS AND METHOD FOR TESTING COMPUTER SYSTEMS

[75] Inventor: Daniel J. Sifter, San Francisco, Calif.

[73] Assignee: ObjectSwitch Corporation, Larkspur, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,958

[22] Filed: Jul. 3, 1997

Related U.S. Application Data

[60] Provisional application No. 60/021,128, Jul. 3, 1996.

[51] Int. Cl.[7] .......... G06F 9/45
[52] U.S. Cl. .......... 395/704
[58] Field of Search .......... 395/704

[56] References Cited

U.S. PATENT DOCUMENTS

| | | | |
|---|---|---|---|
| 4,819,233 | 4/1989 | Delucia et al. | 395/704 |
| 5,495,571 | 2/1996 | Corrie et al. | 395/183.14 |

OTHER PUBLICATIONS

Sinha et al. Critera for Testing Exception–handling Constructs in Java Programs. IEEE International Conference on Software Maintenance Proceedings. pp. 265–274, Aug. 1999.

Sinha et al. Analysis of Programs with Exception–hanldling Constructs. International Conference on Software Maintenance Proceedings. pp. 348–357, Nov. 1998.

*Primary Examiner*—Tariq R. Hafiz
*Assistant Examiner*—Wei Zhen
*Attorney, Agent, or Firm*—Limach & Limbach L.L.P.

[57] ABSTRACT

A white box testing method tests public interfaces within a component of a software system. A setup function is executed to configure a nested public interface within the component to raise an exception. Initialization code is executed that calls the setup function. Test code is executed that calls the component and that evaluates how the component handles the exception raised by the nested public interface. Code is executed within the nested public interface to determine whether the setup function has been called and to raise the exception in response to an affirmative determination.

21 Claims, 1 Drawing Sheet

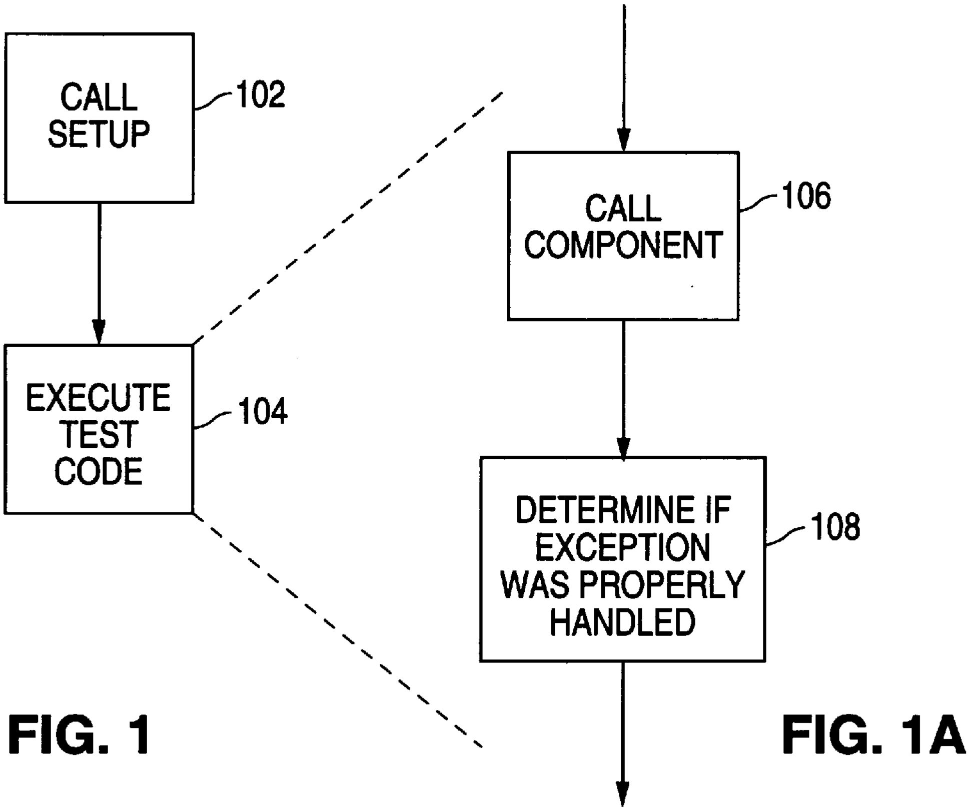
FIG. 1
FIG. 1A
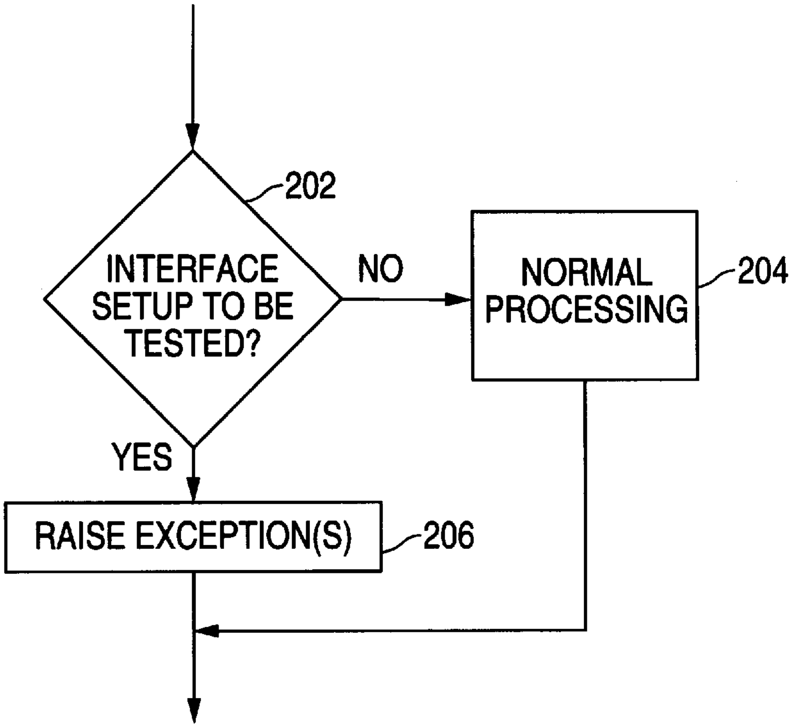
FIG. 2

APPARATUS AND METHOD FOR TESTING COMPUTER SYSTEMS

RELATED APPLICATION

This application claims priority from provisional application number 60/021,128 (filed Jul. 3, 1996).

BACKGROUND OF THE INVENTION

The invention relates generally to the field of structural software testing tools. More specifically, the invention defines both an instrumentation method that increases software testability, as well as an implementation of a test driver that provides the mechanism for individually testing each software component as the software component is developed.

Quality assurance of software products is a specialized segment of the software industry. Software testing products that provide analyses and estimations of the quality of a software product are widely available. Within the set of such widely available products, many different test methods are defined and implemented to verify product quality. Each product or test implementation varies in the type and range of tests performed by it, from very broad to very specific. Test products also vary from one to another in their specific implementation of a test methodology.

In general, there are two high level categories of software testing products. These areas are functional, or black box, testing; and structural, or white box, testing. Functional testing compares test program behavior against a set of requirements. Structural testing compares test program behavior against the intended behavior of the source code.

A primary concern within the practice of structural testing, is the ability to test 100% of the product code. This test parameter is referred to as "code coverage". Code Coverage becomes increasingly more important as the role of the software product being developed comes closer to "mission critical".

Within the telecommunications industry, where systems are designed to operate non-stop, the ability to verify, and prove, the quality of a software product, prior to placing it in service, is critical. While software testing products are available that will report code coverage parameters, and software testing methods are available to improve those coverage parameters, what is needed is a product or methodology that guarantee absolute 100% code coverage as part of software quality assurance. Present methodologies rely on an ad hoc sequence of writing tests and measuring code coverage numbers, and then repeating the process until acceptable code coverage is obtained.

SUMMARY

In accordance with an embodiment of the invention, a white box testing method tests public interfaces within a component of a software system. A setup function is executed to configure a nested public interface within the component to raise an exception. Initialization code is executed that calls the setup function. Test code is executed that calls the component and that evaluates how the component handles the exception raised by the nested public interface. Code is executed within the nested public interface to determine whether the setup function has been called and to raise the exception in response to an affirmative determination.

BRIEF DESCRIPTION OF THE FIGURES

FIG. 1 illustrates processing to be executed by test code to test a nested public interface.

FIG. 1A illustrates the step of executing test code of FIG. 1 in greater detail.

FIG. 2 illustrates processing to be executed by the nested public interface in support of the testing of FIG. 1.

DESCRIPTION OF AN EMBODIMENT

One embodiment of the invention includes a processor coupled to a memory. The memory stores data and instructions used by the processor to implement one embodiment of the invention. In one embodiment of the invention, the processor and memory are included in a Sparcstation™ workstation from Sun Microsystems, Inc., of Mountain View, Calif. Other embodiments run on other computer platforms such as an IBM PC compatible running the Windows NT™ operating system.

1.0 Instrumentation Architecture

Every public interface in the system contains a description of all of the exceptions that can be raised by the interface. The descriptions of the public interfaces and their associated exceptions are specified in Interface Definition Language (IDL). The instrumentation architecture provides a mechanism to configure an interface to raise each of the exceptions defined in the interface definition.

To provide a consistent interface for the test cases, and to support the internal instrumentation of the code under test, a single base type is defined from which all other pseudo objects defined in the system must inherit. The public interface of the base type is:

```
interface DSERoot
{
  // Exception control
  void setException(in string operationName,
    in string exceptionName,
    in unsigned long nextOccurance,
    in unsigned long frequency);
  void setNestedException(
    in string operationName,
    in string exceptionName,
    in unsigned long nextOccurance,
    in unsigned long frequency);
  // Instrumentation operations
  boolean checkException(
    in string operationName,
    in string exceptionName);
  boolean checkNestedException(
    in string operationName,
    out string exceptionName,
    out unsigned long nextOccurance,
    out unsigned long frequency);
  // Operating system errors
  void setOSError(in string functionName,
    in long errorCode);
  boolean checkOSError(in string functionName,
      out long errorcode);
};
```

The setException operation is used to request an object under test to raise the specified exception. The exception is raised by the specified operation after the nextOccurance number of times it has been called. The number of times the exception is raised is specified in the frequency argument.

The checkException operation is used by an implementation of an interface to determine if the specified exception should be raised this time through the operation.

The setNestedException and checkNestedException operations are described below in "Nested Components".

The use of the white-box testing operations is now described with reference to the following example interface definition.

```
exception someException{};
interface TestExample:DSERoot
{
  void someOperation() raises(someException);
};
```

The TestExample interface may be an object representing telecommunications equipment, such as a network switch or a cross-connect. The test Example interface also could be an object representing a call detail record in a persistent store. The functionality provided by the object does not impact the ability to implement white-box testing in accordance with the invention.

A test case for the TestExample interface uses the following code to cause an exception to be raised:

```
TestExample        testExample;
// Configure someOperation to raise someException
// the next time it is called. The exception
// should be raised only once
testExample.setException("someOperation", "someException", 1, 1);
// Now call someOperation. It will raise an
// exception
try
{
  testExample.someOperation();
}
catch(someException)
{
  // Handle exception
}
```

The implementation of someOperation would use the following code to allow the test infrastructure to raise any configured exceptions:

```
TestExample::someOperation(void)
{
  // Check to see if an exception should be
  // raised this time through. If so
  // declare the exception and raise it using
  // something like the C++ throw operator.
  if (checkException("someOperation",
    "someException))
  {
    someException exception;
    throw (exception);
  }
  // Perform normal functionality of operation
}
```

All of the operations defined in the DSERoot type are accessed using macros. Macros will be used to allow the testing instrumentation code to be compiled out for production builds. For example,

```
#if       !defined(DEBUG)
#define   CHECKOSERROR(F,E)
#else
#define   CHECKOSERROR(F,E)   checkOSError(F,E)
#endif    // DEBUG
```

1.1 Nested Components

The functionality described above handles the case where a single, non-nested, component is under test. However, it does not provide support for testing nested components. Nested components are components which call other components.

The white-box test code can easily configure the non-nested component interface to raise exceptions. However, the test code does not have access to the objects of the nested component interface. For this reason, the nested component interface must be configured to raise exceptions using the objects that are exposed by the non-nested interface.

The setNestedException and checkNestedException operations provide the fuinctionality required to allow an exposed component to configure exceptions for a nested interface. Test code uses the setNestedException operation to request the component under test to configure a nested component to raise the specified exception. The arguments to this operation have the same meaning as the setException operation described above.

The component under test uses the checkNestedException operation to determine if it should configure a nested interface to raise an exception. The checkNestedException operation must be repeatedly called by the component under test until returns false to the calling component. This is required to allow multiple exceptions to be configured for a single operation under test.

The following example clarifies how:

```
exception someException{};
exception nestedException{};
interface TestComponent:DSERoot
{
  void someOperation() raises(someException);
};
interface NestedComponent:DSERoot
{
  void nestedOperation()
    raises(nestedException);
};
```

The test code performs the following to cause a NestedComponent object to raise an exception:

```
TestComponent        testComponent;
// Configure nestedOperation to raise
// nestedException the next time it is called.
// The exception should be raised only once
testComponent.setNestedException("nestedOperation",
  "nestedException", 1, 1);
// Now call someOperation which in turn calls
// nestedOperation
try
{
  testComponent.someOperation();
}
catch(nestedException)
{
  // Handle exception
}
```

The implementation of someOperation takes the following steps to configure the nested component to raise the requested exception:

```
TestComponent::someOperation(void)
{
  NestedComponent        nestedComponent;
  // Normal processing for this operation.
```

-continued

```
// Just before calling nestedOperation
// the following code must exist
// Check to see if we need to configure
// the nested component to raise an
// exception. The exception to configure
// (if any) is returned in nestedException.
while (checkNestedException(
   "nestedOperation", &nestedException,
   &nextOccurance, &frequency)
{
   // configure the requested exception
   nestedComponent.setException(
      "nestedOperation,
      nestedException, nextOccurance,
      frequency);
}
// call the nested operation
try
{
   nestedComponent.nestedOperation();
}
catch(nestedException)
{
   // Handle exception
}
}
```

The setNestedException and checkNestedException operations are accessed through macros to allow them to be compiled out of production builds.

1.2 System Services

Testing system components that interface with operating system services requires special support for white-box testing.

The setOSError operation globally configures the specified operating system function to raise the specified error. The scope of this operation is process-wide, not a specific object as the other functionality described above. For example, if the setOSError operation is called with a function name of "CreateFile", an error code of "INVALID_HANDLE_VALUE", a next occurrence value of one, and a frequency of 2, the next two times the CreateFile operating system function is called from anywhere within the process, it will fail and return an INVALID_HANDLE_VALUE.

All operating system functions called by system services are a macro that in debug mode calls the checkOSError operation using(?), and that in non-debug mode calls the operating system function call directly. These macros are operating system specific.

For example, in an embodiment for use with a Unix system, a WB_OPEN macro is utilized, and in an embodiment for use with a NT system, a WB_CREATEFILE macro is utilized. It is not the intent of these macros to provide platform portability. Platform portability is provided by the system services component as a whole. The macros are used merely to provide a mechanism for compiling out debug code in production builds.

Operating system errors can be configured from test code that may be multiple layers above the actual system services. This provides a mechanism to test a complete system under resource failure conditions.

1.3 Methodology

The functionality described in this document provides a mechanism to perform white-box testing on all public interfaces of all components in the system. It is not intended for testing objects internal to each component Diagnostic instrumentation of internal objects may be performed using conventional diagnostic methods (asserts, tracing, etc.).

The engineering goal of 100% code coverage (both call and segment) requires every conditional branch in a component under test (CUT) to be covered as part of white-box testing. The conditional branches required by the functionality of a CUT (e.g. "if >100 do this, else do that") is exercised as part of the white-box test code written for the component. The conditional branches required for error handling (e.g. "try { } catch { }) are exercised using the services provided by the DSERoot type described herein.

In general, the development of the white-box test code in accordance with the invention is iterative. That is, additional test cases are added as code coverage analysis identifies code paths that were not completely tested. These test cases are added by reviewing the code path and adding a specific test case to cause the path to be exercised.

2.0 Test Driver Architecture

This section a test driver for white-box tests in accordance with an embodiment of the invention. The test driver environment provides an execution environment in which test cases are be easily installed and configured.

The test driver provides the following services for test cases:

execution environment, configuration mechanism, logging mechanism, multi-threaded operation, All test cases that are installed in the test driver are sub-typed from the abstract TestCase type. This abstract type defines the operations that are used by the test driver to execute the test case. The test driver provides a complete execution environment for a test case. That is, the test driver owns the "main( )" program.

2.1 Configuration

Test cases are installed in a test case driver by statically defining an instance of a sub-type of TestCase in a global array. One embodiment does not support dynamically adding test cases to a test driver executable. Thus, in such an embodiment, a static link must be performed.

The declaration of the information in the global configuration array is:

```
typedef struct
{
   unsigned long    ordering;
   string           testCaseName;
   TestCase           testCase;
} TestCaseDescription;
typedef TestCaseDescription          testCaseList[];
```

The TestCaseDescription.ordering member is described below.

The TestCaseDescription.testCaseName is a textual name of the test case. This is used for logging by the test driver. The TestCaseDesription.testCase is an instance of the test case that should be executed by the driver.

The testCaseList array is a global array to which test cases are statically defined. When the test case driver is started, it uses this array to locate instances of test cases that should be run.

The test driver supports the following configuration variables:

TABLE 1

Test Driver Configuration Variables

| Variable | Description |
|---|---|
| Test_LogFileRoot | The root name of the log file. The actual log file name has the thread identifier added as a suffix. The default value of this configuration variable is "TestLog". |
| Test_TestCase_List | A colon description separated list of the test cases that should be run. If there are multiple instances of a particular named test case configured in the testCaseList array, all instances are run. The default value of this configuration variable is an empty string, indicating that all test cases in the testCaseList array are to be run. |
| Test_TestContinue | Indicate whether the driver should continue to execute test cases following a test case failure. Valid values for this variable are "true" or "false". "true" indicates that the test driver should continue following a test case failure, "false" indicates that the test driver should stop. The default value for this configuration variable is "true". |

2.2 Threading

The number of threads that are started by the test case driver is controlled by the values in the TestCaseDescription.ordering field. If all test cases configured in the testCaseList array have the same value for the ordering member, a thread is created for each test case that is being run. In such a case, the actual scheduling order of the threads is controlled by the underlying operating system there is no ordering guaranteed by the test case driver. If the ordering member is different, the test cases are run in the order specified by this member.

For example, if the testCaseList contains the following values for the ordering member:

```
testCaseList[0].ordering = 0;
testCaseList[1].ordering = 1;
testCaseList[2].ordering = 2;
testCaseList[3].ordering = 2;
testCaseList[4].ordering = 3;
```

Initially, only a single thread would be created and the test cases would be executed in the following order in this thread:

```
testCaseList[0].testCase.runTestCase(_);
testCaseList[1].testCase.runTestCase(_);
// Create another thread since two test cases
// need to be started at the saine time
testCaseList[2].testCase.runTestCase(_);
testCaseList[3].testCase.runTestCase(_);
// When both of these test cases have finished,
// run the final test case
testCaseList[4].testCase.runTestCase(_);
```

Through the use of the ordering member, the number of threads and in the ordering of the test cases can be easily controlled. All synchronization of the test cases is managed by the test driver. The test cases themselves do not have to be concerned with about threading, other than being thread safe, (i.e., reentrant).

Ordering of test cases is invaluable in testing for race and timing errors between system components.

2.3 Execution

The test driver executes the operations implemented by all test cases in the following order:

```
TestCase.initialize(_);
TestCase.runTestCase(_);
TestCase.terminate(_);
```

These operations are always executed from the same thread for any given test case. If the initialize operation fails, the test driver does not call the runTestCase or terminate operations. The terminate operation is always called regardless of whether the runTestCase operation succeeds or fails.

The Test_TestContinue configuration variable, noted above, is used to control the behavior of the test driver following a test case failure. If this variable is set to true, the test driver continues to execute after a test case failure. If this variable is set to false, the test driver terminates after a test case failure.

2.4 Logging

The test driver logs information when all operations associated with a test case are called. The TestCaseDescription.testCaseName is logged with this information. In addition, a time-stamp is also added to all log messages.

The test cases can also log information using the SA:MessageLog object passed into every operation implemented by a test case.

A separate log file is created for each thread used by the test driver. This ensures that messages written to a log file are serialized, since there will only be a single writer to that log file at any given time.

The actual name of the log file name is based on the Test_LogFileRoot configuration variable with the thread identifier added as a suffix.

2.5 Methodology

Test cases are written to either succeed or fail. All validation of the test results are done directly in the test case. There is no use of "canon" (comparison) files that are compared with the results of a test case to determine if a test succeeded or failed. Including all test case validation into the test cases themselves ensures that there are no inconsistencies introduced into the testing environment by out-of-date external canon files. Test failures are detected immediately, instead of after another post-processing step required to compare the canon files. This eliminates a big source of invalid testing results introduced by traditional testing environments where multiple steps are required to determine whether a test was successful. These invalid testing results can impact the code coverage results since they are not detected as part of the normal test execution process.

A log file should only be used by test cases for informational and debugging purposes. A log file is not meant to be used to determine if a test case succeeded or failed.

3.0 Type Descriptions

DSERoot

Type Description

Base type that provides testing services to all other objects in the system.

Interface

```
module Testing
{
  // IDL for DSERoot interface
```

-continued

```
interface DSERoot
{
    // Exception control
    void setException(in string operationName,
        in string exceptionName,
        in unsigned long nextOccurance,
        in unsigned long frequency);
    void setNestedException(
        in string operationName,
        in string exceptionName,
        in unsigned long nextOccurance,
        in unsigned long frequency);
    // Component under test operations
    boolean checkException(in string operationName,
        in string exceptionName);
    boolean checkNestedException(
        in string operationName,
        out string exceptionName,
        out unsigned long nextOccurance,
        out unsigned long frequency);
    // Operating system errors
    void setOSError(in string functionName,
        in long errorCode,
        in unsigned long nextOccurance,
        in unsigned long frequency);
    boolean checkOSError(in string functionName,
        out long errorCode);
  };
};
```

Creation

DSERoot new( )

Create a new instance of a DSERoot type.

Destruction

Destroy the object. If there are any scheduled pending exceptions an assertion is raised. This ensures that the test case is consistent in scheduling and handling all exceptions.

Attributes

None.

Operations setException—Cause the exception specified in the exceptionName argument to be raised for the operation specified in the operationName argument. The nextOccurance argument specifies the number of times that the operation must be called before the exception will occur. A value of zero for nextOccurance causes the exception to be raised after a random number of calls. The frequency argument specifies the number of times the exception should be raised for the operation.

setNestedException—Cause the exception specified in the exceptionName argument to be raised for the operation specified in the operationName argument for a nested component. The nextOccurance argument specifies the number of times that the nested operation must be called before the exception will occur. A value of zero for nextOccurance causes the exception to be raised after a random number of calls. The frequency argument specifies the number of times the exception should be raised for the nested operation.

checkException—This operation is used by the implementation of the object under test. When this operation is called, if the operationName and exceptionName arguments specify a configured exception that is due to be raised, this operation will return true.

checkNestedException—This operation is used by an implementation to configure exceptions for interfaces that is uses. True is returned the first time after the setNestedException operation is called for the object under test. False is returned all other times. The operationName is used by the implementation to specify which operation should be checked for configured exceptions. The exceptionName, nextOccurance, and frequency output arguments are used by the implementation to configure the requested exception. This operation must be called until it returns false to handle the case where multiple exceptions have been configured for the object under test.

setOSError—Causes the error specified in the errorCode argument to be raised for the operating system function in the functionName argument. The nextOccurance argument specifies the number of times that the function must be called before the error will occur. A value of zero for nextOccurance causes the error to be raised after a random number of calls. The frequency argument specifies the number of times the error should be raised for the function.

checkOSError—This operation is used by the implementation of the system services to determine when an error should be raised by an operating system function. When this operation is called, if the functionName identifies a function call that should raise an error, this operation will return true and the error code to raise is returned in the errorCode output argument.

Exceptions

None.

Comments

All objects must inherit from this root type to integrate with the white-box testing methodology used in the Distributed Services Environment. All operations on this type are accessed through macros. These macros only call the DSERoot operations in debug builds. In non-debug builds, these macros are compiled out of the code for increased performance.

Multiple exceptions can be configured for a single operation by calling setException and setNestedException operations multiple times with the same operationName and different exceptionName arguments. If multiple exceptions have been configured to be raised for the same operation at the same time, the actual exception that will be raised is undefined. It is the responsibility of the test code to configure the system under test to raise deterministic exceptions.

TestCase

Type Description

Abstract type that describes the protocol for test cases in the test driver.

Interface module Testing

```
{
    // Exceptions raised by this interface
    exception TestCaseFailed
    {
            string reason;
    };
    exception TestInitFailed
    {
            string reason;
    };
    // IDL for TestCase interface
    interface TestCase
    {
            attribute readonly string    testCaseName;
            void initialize(in SA::ThreadAccess threadAccess,
                    in SA::MessageLog messageLog)
                    raises(TestInitFailed);
            void runTestCase(in SA::ThreadAccess threadAccess,
                    in SA::MessageLog messageLog)
                    raises(TestCaseFailed);
            void terminate(in SA::ThreadAccess threadAccess,
                    in SA::MessageLog messageLog);
            };
```

-continued

```
};
```

Creation

There is no constructor for this abstract type. However, all subtypes of the TestCase type must provide a constructor. This constructor is called by the test case driver (or compiler).

Destruction

There is no destructor for this abstract type. However, all subtypes of the TestCase type must provide a destructor. Destruction of test case objects is done by the test driver (or compiler). Calling the destructor from the implementation of a test case will cause undefined, but bad, behavior.

Attributes testCaseName—The name of the test case. This attribute is set by the test driver from the configuration information associated with the test case.

Operations initialize—Initialize the test case. This operation is called by the test case driver to initialize the test case. The threadAccess argument can be used by the test case implementation to access information about the thread in which the test case is executing. The messageLog argument can be used by the test case implementation to log messages to the log associated with the test case.

runTestCase—Execute the test case. This operation is called by the test case driver to execute the test case. The threadAccess argument can be used by the test case implementation to access information about the thread in which the test case is executing. The messageLog argument can be used by the test case implementation to log messages to the log associated with the test case.

terminate—Terminate the test case. This operation is called by the test case driver to terminate the test case. The threadAccess argument can be used by the test case implementation to access information about the thread in which the test case is executing. The messageLog argument can be used by the test case implementation to log messages to the log associated with the test case.

Exceptions

TestCaseFailed—The test case failed. This exception is raised by the test case if the test failed. The reason for the failure is returned in the reason member of the exception.

TestInitFailed—The test case initialization failed. This exception is raised by the test case if the initialization of a test case failed. The reason for the failure is returned in the reason member of the exception.

Comments

Actual test cases must provide an implementation for all of the operations defined in this interface.

The testCaseName attribute is used by the test driver when logging information associated with a test case.

The test case driver ensures that the initialize, runTestCase, and terminate operations are always called in order. If the initialize operation fails, the test driver does not call the runTestCase or terminate operations. The terminate operation is always called after runTestCase completes, even if it failed.

All of the test case operations, initialize, runTestCase, and terminate are run in the same thread.

3.0 Example

The following example helps illustrate an embodiment of the invention. In this example, a software engineer wishes to test a portion of code responsible for accessing files. The test case to test the pseudo-code is as follows:

| Test Case Code | Code Under Test | Operating System |
|---|---|---|
| /*Normal I/O operation*/ do__normal__read( ); (1)=> | | |
| | file I/O code checks if OSError is set. No OSError set, therefore file I/O request executed (2)=> | |
| | | access file (3) |
| | | <= return information (4) |
| | <= return file information (5) | |
| Test case passed the normal read test? Yes (6) | | |
| /* Force error on next read */ | | |
| setOSError( "codeUnderTest", −255, 1, 1); (7)=> | | |
| | file I/O code sets up to error and returns control to test case (8) | /* no operation in OS */ |
| do__normal__read( ); (9)=> | | |
| | file I/O code checksOSError and returns value of OSError (10) | /* no operation in OS */ |
| Test case passed abnormal read test? Yes (11) | | |

FIGS. 1 and 2 summarize the operation of an embodiment of the white box testing method described. Referring first to FIG. 1, at step 102 the setup function is executed. Executing the setup function sets up the interface to be tested to raise an exception when the interface is later executed. At step 104, test code is executed. FIG. 1A shows step 104 in greater detail.

In particular, at step 106, the component in which the interface to be tested is nested is called. At step 108, it is determined if the component properly handled the exception raised by the nested interface.

FIG. 2 illustrates the processing of the nested interface. At step 202, a determination is made as to whether the interface has been set up to be tested. If not, the object of the interface executes normal processing. Otherwise, the interface causes the exception (or exceptions, if so set up) for which the interface has been set up to cause.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A white box testing method for testing how code of a software system being executed by a computer reacts to an exception raised by a public interface that is nested within a component the method comprising:

providing a setup function for execution by the computer that, when called by code executing by the computer, is executed by the computer to configure the nested public interface within the component to raise an exception;

providing initialization code for execution by the computer that, when executed by the computer, calls the setup function; and providing test code for execution by the computer that, when executed by the computer, calls the component so as to cause the public interface nested within the component to raise an exception, wherein the test code evaluates how the component handles the exception raised by the nested public interface.

2. The white box testing method of claim 1, and further including:

providing code within the nested public interface of the component for execution by the computer that, when executed by the computer, determines whether the setup function has been called to configure the nested public interface to raise an exception and that raises the exception in response to an affirmative determination.

3. The white box testing method of claim 1, wherein the setup function, when executed by the computer, takes an input "nextOccurrence" argument; and the setup function, when executed by the computer, configures the nested public interface to not raise the exception until the nested public interface has been called a number of times represented by the nextOccurrence argument.

4. The white box testing method of claim 1, wherein the setup function, when executed by the computer, takes an input "nextOccurrence" argument; and if the nextOccurrence argument so indicates, when the setup, function is executed by the computer, the setup function configures the nested public interface to not raise the exception until the nested public interface has been called a number of times as determined from a random function.

5. The white box testing method of claim 1, wherein the exception is a first exception;

the setup function, when called, is executed by the computer to configure the nested public interface within the component to raise both the first exception and a second exception; and the test code calls the component so as to cause the public interface nested within the component to raise both the first exception and the second exception, wherein the test code evaluates how the component handles the first exception and the second exception raised by the nested public interface.

6. The white box testing method of claim 1, wherein the test code, when executed by the computer, includes code that when executed starts a plurality of threads, wherein each thread executes code for a separate test case.

7. The white box testing method of claim 6, wherein the test code, when executed by the computer, schedules the plurality of threads responsive to an ordering member.

8. A white box testing method for testing how code of a software system being executed by a computer reacts to an exception raised by a public interface that is nested within a component, the method comprising:

executing by the computer a setup function to configure the nested public interface within the component, when executed by the computer, to raise an exception;

executing by the computer initialization code that calls the setup function; and executing by the computer test code that calls the component so as to cause the public interface within the component to raise an exception and that evaluates how the component handles the exception raised by the nested public interface.

9. The white box testing method of claim 8, and further including:

executing code by the computer within the nested public interface of the component to determine whether the setup function has been called to configure the nested public interface to raise an exception and to raise the exception in response to an affirmative determination.

10. The white box testing method of claim 8, wherein the setup function, when executed by the computer, takes an input "nextOccurrence" argument; and the step of executing the setup function by the computer includes the computer configuring the nested public interface to not raise the exception until the nested public interface has been called a number of times represented by the nextOccurrence argument.

11. The white box testing method of claim 8, wherein the setup function, when executed by the computer, takes an input "nextOccurrence" argument; and the step of executing the setup function by the computer includes, if the nextOccurrence argument so indicates, configuring the nested public interface to not raise the exception until the nested public interface has been called a number of times as determined from a random function.

12. The white box testing method of claim 8, wherein the exception is a first exception;

the step of executing the setup function by the computer includes configuring the nested public interface within the component to, when executed by the computer, raise both the first exception and a second exception; and the step of executing the test code by the computer includes calling the component so as to cause the public interface nested within the component to raise both the first exception and the second exception and then evaluating how the component handles the first exception and the second exception raised by the nested public interface.

13. The white box testing method of claim 8, wherein the test code, when executed by the computer, starts a plurality of threads, where each thread executes code for a separate test case.

14. The white box testing method of claim 12, wherein the test code, when executed by the computer, schedules the plurality of threads responsive to an ordering member.

15. An article of manufacture comprising a computer useable medium having computer-readable white box testing program code embodied therein, the white box testing code for configuring a computer to test a public interface nested within a component of a software system being executed by the computer, the white box testing code embodied in the article of manufacture comprising:

setup function computer readable software means that, when called by code executing by the computer, is executed by the computer to configure the nested public interface within the component to raise an exception;

initialization code computer readable software means for execution by the computer that, when executed by the computer, calls the setup function; and test code computer readable software means that, when executed by the computer, calls the component so as to cause the public interface nested within the component to raise an exception, wherein the test code evaluates how the component handles the exception raised by the nested public interface.

16. The article of manufacture of claim 15, and further including:

determining and raising computer readable code means within the nested public interface for execution by the computer that, when executed by the computer, determines whether the setup function has been called to configure the nested public interface to raise an exception and raises the exception in response to an affirmative determination.

17. The article of manufacture of claim 15, wherein the setup function computer readable software code means, when executed by the computer, takes an input "nextOccurrence" argument; and the setup function computer readable software code means, when executed by the computer, configures the nested public interface to not raise the exception until the nested public interface has been called a number of times represented by the nextOccurrence argument.

18. The article of manufacture of claim 15, wherein the setup function computer readable software code means, when executed by the computer, takes an input "nextOccurrence" argument; and if the nextOccurrence argument so indicates, the setup function computer readable code means, when executed by the computer, configures the nested public interface to not raise the exception until the nested public interface has been called a number of times as determined from a random function.

19. The article of manufacture of claim 15, wherein the exception is a first exception;

the setup function computer readable code means, when called, is executed by the computer to configure the nested public interface within the component to, when executed by the computer, raise both the first exception and a second exception; and the test code computer readable code means that, when executed by the computer, calls the component so as to cause the public interface nested within the component to raise both the first exception and the second exception and evaluates how the component handles the first exception and the second exception raised by the nested public interface.

20. The article of manufacture of claim 15, wherein the test code computer readable code means includes computer readable code means that, when executed by the computer, start a plurality of threads, wherein each thread executes code for a separate test case.

21. The article of manufacture of claim 20, wherein the test code computer readable code means, when executed by the computer, schedules the plurality of threads responsive to an ordering member.

* * * * *